Aug. 17, 1948. L. C. OAKLEY, JR 2,447,359
PRODUCTION OF SODIUM FLUOSILICATE
Filed Dec. 1, 1944
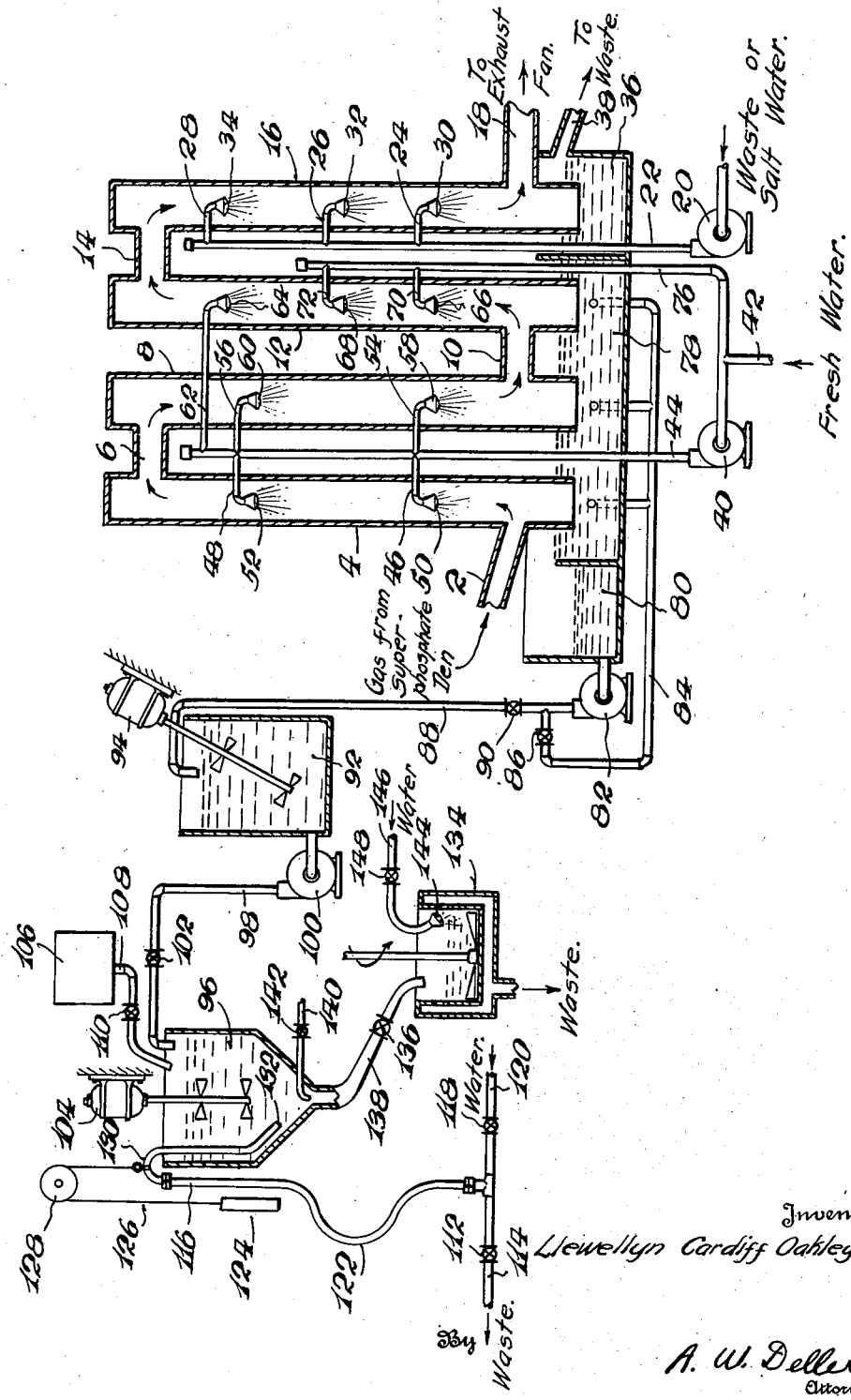
Inventor
Llewellyn Cardiff Oakley, Jr.
By A. W. Deller,
Attorney Patented Aug. 17, 1948

2,447,359

UNITED STATES PATENT OFFICE 2,447,359

PRODUCTION OF SODIUM FLUOSILICATE

Llewellyn Cardiff Oakley, Jr., Tampa, Fla., assignor to Tennessee Corporation, New York, N. Y., a corporation of New York Application December 1, 1944, Serial No. 566,094

7 Claims. (Cl. 23—88)

The present invention relates to the production of fluosilicates and, more particularly, to the recovery of fluorine compounds from waste gases produced in superphosphate manufacture and conversion of the fluorine compounds into fluosilicates.

In the manufacture of superphosphate from phosphate rock by the treatment of the rock with sulphuric acid, gases are evolved containing hydrofluoric acid, silicon tetrafluoride, and water vapor, together with other impurities, which are toxic and cannot be permitted to escape into the atmosphere.

Various methods have been devised and used in the recovery of fluorine in usable form, such as sodium fluoride, sodium fluosilicate, hydrofluoric acid, artificial cryolite, hydrofluosilicic acid, silicon fluoride, and other compounds, but the methods have not proved entirely satisfactory for various reasons. The superphosphate gases have not been cleaned sufficiently to remove the last traces of noxious constituents, the yields of the fluorine compounds have been low, due in most part to inefficient methods of conversion and recovery, and the compounds obtained are contaminated with silica and other impurities.

In the production of sodium fluosilicate from fluorine compounds derived from superphosphate gas, considerable difficulty has been encountered in the drying of the fluosilicate because of contamination with silicic acid which holds considerable quantities of moisture in the bound state. Difficulties have also been encountered in the separation of silicic acid from the hydrofluosilicic acid before precipitation of the sodium fluosilicate, as heretofore carried out by methods in general use, and yields of only from 30 to 60% of the total amount of fluorine in the superphosphate gases have been obtained by the prior methods.

Contrary to the prior method for the production of sodium fluosilicate, in which silicic acid is separated from the hydrofluosilicic acid prior to the reaction with a sodium salt to form the corresponding fluosilicate, the method of the present invention retains the silicic acid admixed with the hydrofluosilicic acid during the reaction with sodium chloride or other salt employed to form the fluosilicate, the silicic acid being retained in suspension during the reaction, and in the same ratio or proportion to the hydrofluosilicic acid as exists in the scrubber towers during the formation of the hydrofluosilicic acid. The amount of water employed in the scrubber towers is controlled moreover so as to produce a concentration of the hydrofluosilicic acid in the acid slurry which will react with the brine or salt solution when added under the conditions hereinafter set forth to produce a crystal size of the fluosilicate which will readily settle in the acid slurry while the silicic acid remains in suspension, thus permitting the separation of the fluosilicate salt from the acid slurry in a relatively pure state, without the inclusion of silicic acid or other impurities.

By means of the method of the invention, hereinafter described in detail, the fluosilicate, as sodium fluosilicate, may be obtained substantially pure, containing from 98.5 to 99.5 percent of the fluosilicate, with as little as from 0.3 to 0.5% of sodium acid fluoride, and 0.5% of moisture or less. The method of the invention makes possible a yield of from 96 to 98% recovery of the fluorine compounds in the superphosphate gases in the form of hydrofluosilicic acid. By the method of the invention also the drying cost of the fluosilicate product is greatly reduced over the methods heretofore used, since the exclusion of silicic acid from the fluosilicate crystals renders the drying of the product relatively easy and the maintenance of drying equipment is correspondingly reduced. During the drying operation, moreover, it is unnecessary to add corrosion-inhibiting agents, such as sodium carbonate, to the fluosilicate product in order to protect the drying equipment during the drying operation, as has heretofore been necessary in drying sodium fluosilicate and other metal fluosilicate salts produced by the methods heretofore employed.

The present invention is based on the discovery that sodium fluosilicate of a high purity may be produced from superphosphate gases by controlling the amount of water passed into the scrubber towers so as to obtain an acid slurry of a gravity of from about 6 to 10° Bé. at 110° F., by which the acid slurry will contain from 4.5 to 9.0% of hydrofluosilicic acid, and then reacting the slurry with brine or a saturated salt solution at a definite controlled rate in amounts equivalent to twice up to nearly three times the theoretical amount of salt required for the reaction to produce sodium fluosilicate or other salt, based on the amount of hydrofluosilicic acid actually present in the acid slurry to be treated, while the silicic acid present in the slurry is kept in suspension, thereby forming crystals of the fluosilicate of a size which will settle through the slurry as soon as the reaction liquid has become quiescent and before any substantial settling of the silicic acid has taken place, thus permitting removal of the fluosilicate crystals from the remaining slurry.

It is an object of the invention to provide a new and improved method for the production of fluosilicates from the acid slurry obtained in the recovery of fluorine compounds from superphosphate gases by which a higher yield of fluosilicates may be obtained.

Another object of the invention is to provide a new and improved method for the recovery of fluorine compounds from superphosphate gases by which a substantially higher yield of such compounds may be obtained than by methods heretofore used.

A further object of the invention is to provide a new and improved method for the production of fluosilicates from the acid slurry obtained in the recovery of fluorine compounds from superphosphate gases which permits a reaction with a soluble salt in the acid slurry to form the corresponding fluosilicate without removal of silicic acid from the acid slurry.

It is also within the contemplation of the invention to provide a new and improved method for the production of fluosilicates from the acid slurry obtained in the recovery of fluorine compounds from superphosphate gases by which fluosilicates of a higher purity than that obtainable by other prior methods may be produced.

Moreover, it is an object of the invention to provide a method for the production of fluosilicates of high purity from the acid slurry produced in the recovery of fluorine compounds from superphosphate gases by controlling the concentration of the acid slurry with respect to the hydrofluosilicic acid and producing a reaction with a soluble salt of the metal, the fluosilicate of which is to be produced, in excess of the theoretical amount required for the reaction and adding the said metal salt at a rate to produce fluosilicate crystals which will have a differential settling rate greater than that of silicic acid or other components of the solution so as to permit separation of the said fluosilicate crystals from the reaction components.

Furthermore, it is an object of the invention to provide a new and improved method for the production of fluosilicates from the acid slurry obtained from the scrubber towers in the treatment of superphosphate gases by which the fluosilicates may be obtained substantially free from silica or silicic acid and substantially free from moisture.

The invention likewise contemplates the provision of a method by which sodium fluosilicate may be produced directly from the acid slurry obtained in the recovery of fluorine compounds from superphosphate gases and by which the drying costs in drying the product may be substantially reduced.

It is still another object of the invention to provide a method for the production of fluosilicates directly from the acid slurry obtained in the recovery of fluorine compounds from superphosphate gases without the separation of silicic acid present in the acid slurry. In accordance with this object of the invention, the concentration of the acid slurry with respect to the hydrofluosilicic acid is controlled in the scrubber towers to within preferably from 6 to 8% of the hydrofluosilicic acid, or at least within 4.5 to 9% of hydrofluosilicic acid, and a salt such as sodium chloride in solution, which is preferably saturated, is added at a controlled rate, such as 25 gallons per minute under ordinary commercial conditions, while the acid slurry is agitated to retain the silicic acid in suspension during the reaction, by which fluosilicate crystals are formed of a size which will settle rapidly in the reaction chamber as soon as the stirring or agitation is arrested and the reaction liquid becomes quiescent, after which the fluosilicate crystals may be substantially completely separated from the reaction components.

It is a further object of the invention to provide a new and improved method for the production of fluosilicates from the acid slurry obtained in the recovery of fluorine compounds from superphosphate gases in which silicic acid is permitted to remain in the presence of hydrofluosilicic acid during reaction with a metal salt, by which the fluorosilicate compound may be separated by a differential settling rate, permitting the silicic acid to be substantially completely removed from the fluosilicate component by decantation or flotation in the presence of the settled layer of fluosilicate.

Still another object of the invention is to provide a method for the recovery of fluorine compounds from superphosphate gases without use of the ordinary slow process of filtration for the removal of silicic acid from the slurry so as to avoid loss of hydrofluosilicic acid through occlusion by the silicic acid.

With these and other objects in view, the invention comprises the various features and combination of steps hereinafter described and more particularly defined in the annexed claims.

The method of the invention is explained in connection with the accompanying drawing, in which the figure is a diagrammatic view in elevation of a form of apparatus in which the method of the invention may be carried out.

Briefly stated, the invention involves the production of fluosilicates, and specifically sodium fluosilicate, by first extracting fluorine compounds for superphosphate gases produced in the manufacture of superphosphate by treatment of the said gases with water, as by spraying water therein, in definite predetermined proportions so as to react with silicon tetrafluoride in the gases to form hydrofluosilicic acid and silicic acid, and so as to absorb hydrofluoric acid in the gases, which reacts with silicic acid present to form additional hydrofluosilicic acid. The amount of water sprayed into the scrubber towers is regulated so as to form an acid slurry containing preferably from 6 to 8 percent of hydrofluosilicic acid, or at least within the range of from 4.5 to 9.0 percent of hydrofluosilicic acid. The acid slurry is then treated with a soluble metal salt so as to form the metal fluosilicate desired, but without the removal or separation of the silicic acid present, as has been the commercial practice heretofore, the metal salt solution employed having a calculated excess of the required amount necessary for the reaction to form the fluosilicate, and being added at a predetermined rate during the addition of at least half of the metal salt solution in order to permit the formation of the desired crystal size of the fluosilicate which may be separated from the mother liquor or remaining acid slurry. For the production of sodium fluosilicate from the acid slurry obtained from the scrubber towers, a sodium chloride solution is preferably used, the amount of sodium chloride theoretically required for the reaction with hydrofluosilicic acid being calculated based on the amount of the said acid in the quantity of acid slurry to be treated. A saturated solution of sodium chloride is then employed in excess of the theoretical amount required, the amount being preferably from 200 to 280 percent of the said theoretical quantity, the salt solution being added at a controlled rate, preferably at the rate of 25 gallons of the solution per minute until at least one half of the amount to be added has been passed into the acid slurry, during which the slurry is stirred or agitated so as to retain the gelatinous silicic acid in suspension. During the addition of the sodium chloride solution, and while the silicic acid is kept in suspension, crystals of sodium fluosilicate are gradually formed, and after the first half of the salt solution has been added, the remainder of the solution may be admitted at substantially any desired rate, but preferably at least twice the speed employed in adding the main portion of the solution. After the total amount of the salt solution has been added, the stirring or agitation of the material in the reaction chamber is discontinued, and the reaction liquid is brought to quiescence by any suitable means, such as by the use of a paddle, and the crystals of the sodium fluosilicate are allowed to settle in the reaction chamber while the silicic acid remains in suspension, which requires generally about five minutes. The supernatant layer of solution containing the silicic acid in suspension may then be decanted or drawn off as by means of a syphon until only a relatively small proportion of the solution remains over the layer of sodium fluosilicate crystals. The crystals may then be separated from the remaining layer of the reaction liquid, preferably by withdrawing the crystals from the reaction chamber through a narrow outlet into a centrifugal separator, in which the crystals may be washed and spun nearly dry, after which the crystals may be dried in any suitable form of dryer so as to contain not more than 0.5 percent of moisture when the product is required for ordinary commercial purposes.

Referring more in detail in the drawing, the numeral 2 designates a pipe leading to the bottom of the scrubber tower 4 from the superphosphate den, not shown, by which the gas from the reaction chamber containing hydrofluoric acid, silicon tetrafluoride and water vapor is passed into the tower. In the tower 4, the gas passes upwardly to a passageway 6 which is connected to the top of the tower and from thence into the tower 8, and downwardly therethrough to a passageway 10 to the lower end of a tower 12, in which the gas passes upwardly to passageway 14 connected to the top of the tower 12, and from thence to a tower 16, in which the gas passes downwardly until it reaches an exit pipe 18 connected at the lower end of the tower 16, through which the gas is exhausted to the atmosphere, being preferably expelled by means of an exhaust fan, not shown.

In order to remove the last traces of hydrofluoric acid and silicon tetrafluoride from the gas in the tower 16 before it is discharged into the atmosphere, salt water, brine, or waste water containing sodium chloride, is pumped by means of a pump 20 through a pipe 22 and branch pipes 24, 26 and 28 into the tower 16, being discharged therein through spray nozzles 30, 32 and 34, connected respectively to pipes 24, 26 and 28, by which the salt water is sprayed into the tower at different levels. After passing to the bottom of the scrubber tower 16, the sprayed salt water containing dissolved or suspended material therein is collected in a catch basin 36 and is discharged to waste through a separate overflow 38.

In order to progressively absorb hydrofluoric acid and silicon tetrafluoride from the gas passing through towers 4, 8 and 12, fresh water is introduced into the towers by means of sprays, being pumped therein by means of a pump 40, preferably at a pressure of about 100 lbs. per square inch. The pump 40 serves to pump water into the tower 4 from a supply pipe 42 to a pipe 44, to which branch pipes 46 and 48 are connected, and to the spray nozzles 50 and 52 in the said tower. Correspondingly, water is pumped to the branch pipes 54 and 56 from the pipe 44 to the spray nozzles 58 and 60 in the tower 8, by which the gas passing downwardly in the tower is scrubbed in its passage therethrough. Water from the pipe 44 is also pumped through a branch pipe 62 into the tower 12, in which the water is sprayed against the upwardly passing gas therein through spray nozzle 64. The water is pumped at high pressure in order to provide a high degree of atomization and to insure a rapid cooling of the gases in passing through the towers, so as to obtain a substantially complete reaction in the towers between the silicon tetrafluoride carried by the gas and the water sprayed into the towers.

It will be understood that the said silicon tetrafluoride and water react to produce hydrofluosilicic acid and silicic acid in accordance with the following equation:

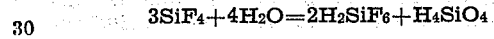

$$3SiF_4 + 4H_2O = 2H_2SiF_6 + H_4SiO_4$$

The pump 40 is preferably mechanically or electrically connected to the phosphate rock mixer mechanism in a manner such that the pump 40 and the sprays 50, 52, 58, 60 and 64 are operated only when the sulfuric acid-phosphate rock mixer is in operation. Thus when the said mixer is operated, the pump 40 is also operated, and when the mixer is stopped, the pump 40 is also stopped.

In the tower 12, additional sprays are employed in addition to the spray 64, the spray nozzles 66 and 68 being connected to branch pipes 70 and 72 respectively, and are preferably operated continuously from the plant fresh water supply conducted to the branch pipes 70 and 72 from a pipe 76 connected to supply pipe 42 as shown. The water conducted to sprays 66 and 68 may be fed at any suitable pressure, say at 35# per sq. in., and should be so arranged as to spray continuously. In the ordinary method of manufacture of superphosphate, small batches of phosphate rock and sulfuric acid are mixed and run into a den. When the den is full, the mixing is stopped, the den opened and the superphosphate cut out and transported to storage. The den is then closed up and prepared for the next mixing. The major portion of the fluorine compounds are given off during the mixing, while during the opening up of the den, cutting out, and preparation of the den for the next charge, only small amounts of fluorine compounds are given off and drawn into the towers. For this reason, only the two sprays 66 and 68 operate during the latter operations, to prevent dilution of the hydrofluosilicic acid.

The water spray passing downwardly in the scrubber towers 4, 8 and 12 discharge into a common sump 78, which connects the bottom of the towers 4, 8 and 12 and overflows to a pump sump 80. In order to keep the silicic acid in suspension in the acid slurry in the sumps 78 and 80, the slurry is pumped from the sump 80 by means of a pump 82 through a pipe 84 back to the sump 78 from which the slurry again overflows to the sump 80 and is re-circulated. The pipe 84 is provided with a valve 86, so that the flow through the pipe 84 may be cut off when desired. When the sump 80 becomes filled with the slurry, it is pumped through a pipe line 88 through the valve 90 to a storage tank 92, in which the silicic acid may be maintained in suspension in the slurry by means of a stirrer or agitator 94. The flow of liquid through the line 88 may be cut off by means of the valve 90 while the slurry is being re-circulated through the pipe line 84 between the sumps 78 and 80.

The silicic acid in the slurry stored in the tank 92 is kept continuously in suspension in the slurry by the operation of the stirrer 94, so that the slurry may be drawn as required from the tank 92 and passed into a reaction tank 96 through a pipe line 98 by means of a pump 100. A cut-off valve 102 is provided in the pipe 98 so that flow through the line may be cut off as desired. When a measured amount of the acid slurry has been passed into the reaction tank 96, an agitator 104, preferably a two bladed stirrer of the "lightning portable" type, is put into operation and the required quantity of brine, or saturated sodium chloride solution, as determined from the amount of hydrofluosilicic acid present in the reaction tank to be treated, is then passed into the reaction tank 96 from a brine measuring tank 106, the amount of sodium chloride employed being equivalent to from 200 to 280% of the theoretical amount of the sodium chloride required to react with the fluosilicic acid present, as may be determined by calculating the said theoretical amount from the following equation:

$$2NaCl + H_2SiF_6 = Na_2SiF_6 + 2HCl$$

After the required amount of sodium chloride solution or brine has been put into the tank 106, it is then allowed to flow at a suitable rate from the tank through a pipe line 108, the rate of flow being controlled by means of a cut-off valve 110 therein, the brine or solution being allowed to flow into the slurry at a rate preferably of about 25 gallons per minute, or other suitable rate, depending upon the size of crystals desired.

The slurry in the reaction tank 96, containing silicic acid, hydrofluosilicic acid and sodium chloride, is vigorously stirred during the addition of the sodium chloride solution by means of an agitator 104, so as to break up any silicic acid agglomerates present in the slurry and to thoroughly disperse the sodium chloride solution throughout the liquid and to accelerate the reaction between the reacting ingredients.

When about one-half of the solution from the tank 106 has been passed into the reaction tank 96, at the controlled rate, the remainder of the salt solution may then be passed into the reaction tank at an increased speed, such as 84 gallons per minute, for example, with entirely satisfactory results.

The crystal size of the sodium fluosilicate which is formed in the reaction tank 96 is determined not only by the rate of flow of the first half or major portion of the brine or sodium chloride solution into the reaction tank, but also by the rate of stirring during the time that the brine is passed into the tank, and to some extent also by the temperature of the slurry during the reaction.

In ordinary superphosphate manufacture, the temperature of the slurry is generally substantially constant, so that little variation in crystal size of the fluosilicate crystals will be produced by variations in the temperature of the gas. Small differences in crystal size obtained by the method of my invention may be accounted for by changes in the rate of feed of the reacting solution, particularly during the time that the first half of the solution is passed into the slurry. It will be understood that by the addition of the brine or salt solution at rates substantially greater than 25 gallons per minute, the crystals of sodium fluosilicate which are formed are smaller in size than those obtained by the addition of the brine solution at a rate of 25 gallons per minute or less, since at the slower rate of admission more time is given for the development of the larger size crystals. The crystal size of the sodium fluosilicate is dependent also, to some extent, on the concentration of the hydrofluosilicic acid in the slurry. It has been found desirable to control the proportion of water passing to the scrubber towers 4, 8 and 12, so as to provide a slurry having a gravity of from 6 to 10° Bé at 110° F., so as to contain from 4.5 to 9 percent of hydrofluosilicic acid, $H_2SiF_6$, and preferably from 6 to 8 percent thereof. Concentrations lower than about 4.5 percent of hydrofluosilicic acid in the slurry produce low sodium fluosilicate yields, and concentrations higher than about 9 percent of hydrofluosilicic acid produce such a large volume of silicic acid per unit volume of slurry that the sodium fluosilicate crystals will not settle through the silicic acid in the succeeding operation next described.

When all of the brine in the tank 106 has been passed into the reaction tank 96, the agitator 104 is stopped and the slurry in the reaction tank may be calmed by any suitable means, such as by the use of a wooden paddle, for example, after which the material in the reaction tank is allowed to settle for a relatively short period of time, preferably about five minutes in ordinary commercial installations. The fluosilicate crystals which are formed settle through the mother liquor or suspension in the tank and may then be separated from the supernatant liquid by drawing off the said liquid by means of a syphon, for example. The apparatus may be prepared for drawing off the main portion of the slurry containing silicic acid in suspension, together with hydrochloric acid and salt, by closing the valve 112 in the pipe 114 and passing water into the syphon 116 by opening the valve 118 in the pipe 120, by which water is passed into the flexible connection or rubber hose 122 and through the syphon 116 until the syphon is filled.

The syphon 116 is preferably mounted so as to be adjustable in position and is preferably counterbalanced by means of a weight member 124 which is attached to a cable or rope 126 which passes over a pulley member 128 and is attached to the upper bend 130 of the syphon. After the syphon 116 has been filled with water from the pipe 120, the valve 118 therein is closed and the syphon is then raised by means of the cable 126 into a position in which the vertical opening 132 at the end of the syphon is just below the surface of the liquid in the reaction chamber. The valve 112 in the pipe 114 is then opened to permit the supernatant liquid in the reaction chamber 96 to be drained off or passed to waste, the syphon being gradually lowered in position as the liquid drains off, in order to keep the opening 132 of the syphon below the liquid surface until substantially all of the liquid has been drained off and only a small amount of the waste slurry is left in the reaction chamber above the layer of fluosilicate crystals.

The fluosilicate crystals are then drawn off into a centrifuge 134 by opening a valve 136 in the drain pipe 138, which is connected to the bottom or conical portion of the reaction tank 96. A suitable amount of water is then admitted to the bottom of the reaction tank 96 through a pipe 140 by opening a control valve 142 therein in order to assist in expelling or drawing off the fluosilicate crystals through the pipe 138 into the centrifuge 134.

All of the contents of the reaction tank 96, except a small proportion of the original charge, corresponding in ordinary size installations to approximately a six inch plug of the fluosilicate crystals, are then drawn off through the pipe 138 into the centrifuge 134, in which the fluosilicate crystals may be washed and centrifuged in the ordinary manner. It will be understood that by withholding the last portion or plug of the fluosilicate crystals in the outlet pipe 138, the residual silicic acid slurry is held back, which prevents it from contaminating the crystals in the centrifuge.

The plug or portion of the original charge which is held back in the pipe 138 may be conveniently retained in the reaction tank 96 so as to become a part of the next batch of acid slurry to be treated.

After the fluosilicate crystals, or sodium fluosilicate, have been passed into the centrifuge 134, water may be sprayed onto the crystals through a spray nozzle 144 attached to the pipe 146 through which water is passed, the flow of water therein being controlled by means of a valve 148. Under ordinary conditions of commercial operation, the wash water will be sprayed over the fluosilicate crystals for a period of about five minutes, which is sufficient to abstract substantially all of the impurities in the crystal mass. The crystals are then centrifuged in the ordinary manner until the material is substantially dry, after which the fluosilicate crystals are further dried in any suitable form of dryer, not shown, preferably until the moisture content of the fluosilicate product is reduced to not more than 0.5 percent.

It will be understood that the method above described constitutes the preferred mode of carrying out the invention and that various modifications may be made in the method steps, as will be apparent to those skilled in the art, without departing from the spirit or scope of the invention as defined in the annexed claims. While it is preferred to separate the supernatant suspension of silicic acid from the settled layer of fluosilicate crystals by syphoning off the supernatant liquid, in the manner above described in detail, it will be obvious that the mother liquor or supernatant suspension might be withdrawn from the crystals by decantation, or by other suitable means.

Having thus described the invention, what is claimed as new is:

1. A method for the production of sodium fluosilicate crystals from fluorine compounds contained in superphosphate gases which comprises spraying water in controlled amounts into the said superphosphate gases to form an acid slurry containing from about 6 to 8 percent of hydrofluosilicic acid together with silicic acid and other components, retaining the said silicic acid in suspension in the said slurry during the said spraying operation, passing the said acid slurry to a reaction chamber while the said silicic acid remains in suspension therein, agitating the said acid slurry in the said reaction chamber to maintain the silicic acid in suspension in the liquid in the said reaction chamber, gradually feeding a strong sodium chloride solution to the reaction chamber until a sufficient amount thereof has been added to react with the hydrofluosilicic acid present to form sodium fluosilicate crystals and thereafter rapidly adding a substantial excess of the said sodium chloride solution while the silicic acid is retained in suspension, permitting the sodium fluosilicate crystals to segregate into a layer for a period of time insufficient to cause settling of the silicic acid in said liquid suspension, and separating the said liquid suspension from the settled sodium fluosilicate crystal layer.

2. A method for the production of a metal fluosilicate from fluorine compounds in superphosphate gases which comprises contacting said gases with a controlled amount of water to form an acid slurry containing between 4.5 and 9.0 percent of hydrofluosilicic acid together with silicic acid and continuously recirculating the said acid slurry during said contacting operation separately from the water contacting said gases so as to maintain said silicic acid in suspension in said acid slurry, adding to said slurry at a controlled rate slowly enough to form metal fluosilicate crystals of sufficient size to settle rapidly and substantially completely from the silicic acid in suspension, a solution of salt of said metal in excess of the amount required to react with the amount of hydrofluosilicic acid present in said acid slurry until the amount required for stoichiometrical reaction with the hydrofluosilicic acid has been added and thereafter rapidly adding the excess of the said metal salt solution, and maintaining the said silicic acid in suspension in the hydrofluosilicic acid in substantially the same stoichiometrical proportion to the hydrofluosilicic acid as when formed in said contacting reaction with water, permitting the reaction mixture to become quiescent to permit settling of metal fluosilicate crystals which have been formed during a period in which the silicic acid remains in suspension and separating the said metal fluosilicate crystals and the said silicic acid suspension.

3. A method for the production of sodium fluosilicate crystals from superphosphate gases which comprises washing said gases with controlled amounts of water sufficient to form an acid slurry containing from 4.5 to 9.0 percent of hydrofluosilicic acid together with silicic acid formed in reaction between silicon tetrafluoride and water, recirculating the formed acid slurry during the said washing operation to maintain the already formed silicic acid in suspension, separating the formed acid slurry, adding to said slurry an excess of sodium chloride solution while maintaining the said silicic acid in suspension, the said solution being added at a controlled rate slowly enough to form sodium fluosilicate crystals of an efficient size, having rapid settling ratio, until the required amount of sodium chloride has been added for stoichiometrical reaction with the hydrofluosilicic acid present in said slurry and thereafter rapidly adding the excess of said sodium chloride solution to complete the formation of sodium fluosilicate crystals, permitting the said crystals to settle in a separate layer while the said silicic acid remains in suspension in the said slurry and drawing off the said silicic acid suspension from the crystal layer to separate the said crystals therefrom.

4. A method for the production of fluosilicate crystals from fluorine compounds carried by superphosphate gases which comprises washing the said gases with a controlled amount of water to form an acid slurry containing from 4.5 to 9.0 percent of hydrofluosilicic acid together with silicic acid formed in the reaction of water with the said fluorine compounds, maintaining the said silicic acid in suspension during the formation of the acid slurry by agitation, removing the acid slurry formed and maintaining the said silicic acid in suspension, treating the said slurry with a substantially saturated salt solution in excess of the amount required for stoichiometric reaction with the hydrofluosilicic acid in the slurry by adding slowly at a controlled rate the amount of salt solution required for stoichiometric reaction to permit formation of relatively large fluosilicate crystals which will settle while the said silicic acid remains in suspension in the said slurry and adding the excess of the salt solution at a relatively rapid rate during agitation of the slurry to retain the said silicic acid in suspension, arresting the said agitation and permitting the said fluosilicate crystals to settle while the silicic acid remains in suspension, syphoning off the said silicic acid suspension except a small residual portion thereof, removing the settled fluosilicate crystals through a narrow outlet except the small residual portion sufficient to form a plug to hold back the said residual suspension and washing the separated crystals.

5. A method for the production of sodium fluosilicate crystals from fluorine compounds in superphosphate gases which comprises spraying water in controlled amounts into said gases to form an acid slurry containing from about 7 to 8 percent of hydrofluosilicic acid together with silicic acid in the reaction of said fluorine compounds with said water, separately recirculating the said acid slurry during the said washing operation, separating a batch of the said acid slurry for treatment to form sodium fluosilicate crystals, stirring the said batch to retain silicic acid in suspension therein, adding to the said batch a strong sodium chloride solution in excess of the amount required for stoichiometric reaction with the hydrofluosilicic acid present in the said batch, an amount of the said sodium chloride solution being first added at a relatively slow controlled rate until the amount required for stoichiometric reaction has been added and the remainder of the said sodium chloride solution being thereafter added at a more rapid rate, maintaining the silicic acid distributed throughout the reaction liquid during the addition of the said sodium chloride solution to the said batch by agitation, arresting the said agitation and permitting the sodium fluosilicate crystals formed to settle into a separate layer in the said suspension, syphoning off the silicic acid suspension except a small residual portion thereof, removing the said layer of sodium fluosilicate crystals through a restricted outlet except a small residual portion sufficient to hold back the said residual suspension to prevent admixture with the said removed crystals, returning the said residual portions to the next batch of acid slurry to be treated, washing and centrifuging the removed sodium fluosilicate crystals and drying the said crystals.

6. A method for the production of fluosilicate crystals from fluorine compounds carried by superphosphate gases which comprises washing the said gases progressively with water sprays in controlled amounts to form an acid slurry containing from about 6 to 8 percent of hydrofluosilicic acid together with silicic acid, separately recirculating the said acid slurry during the said washing operation to maintain the silicic acid in suspension in the slurry, separating a batch of the said slurry, adding to the said batch at a controlled rate without removal of the said silicic acid therefrom a substantially saturated solution of a salt equivalent to between 200 and 280 percent of the amount thereof required to react with the hydrofluosilicic acid present in the said batch to form the corresponding fluosilicate, a portion of the said salt solution equivalent substantially to the amount of hydrofluosilicic acid present in the batch being added at a controlled rate to permit the formation of large fluosilicate crystals and the remainder of said salt solution being added at a more rapid rate, agitating the batch slurry during the addition of the said salt solution to maintain the silicic acid in suspension therein, permitting the fluosilicate crystals formed to settle into a separate layer while the silicic acid remains in suspension, separating the said fluosilicate crystals from the said silicic acid suspension by removal of the major portion of the said suspension from the said layer, washing and centrifuging the said separated crystals to purify the same and drying the crystals to a low water content.

7. A method for the production of sodium fluosilicate crystals from fluorine compounds contained in superphosphate gases which comprises spraying water in limited controlled amounts into the said superphosphate gases to form an acid slurry containing from about 6 to 8 percent of hydrofluosilicic acid together with silicic acid, recirculating the acid slurry during the said spraying operation to retain the silicic acid in suspension, separating a batch of said acid slurry and retaining the silicic acid in suspension therein, feeding a substantially saturated solution of sodium chloride at a rate between 15 and 40 gallons per minute into the said batch until an amount of the sodium chloride substantially equivalent to the hydrofluosilicic acid in the batch has been added and thereafter feeding the said sodium chloride solution at about twice the first rate until from 200 to about 280 percent of sodium chloride has been added, permitting sodium fluosilicate crystals to segregate into a layer for a period of time insufficient to permit settling of the silicic acid in the suspension, syphoning off the said silicic acid suspension except a small residual portion thereof, removing the settled fluosilicate crystals through a narrow outlet except the small residual portion sufficient to form a restriction to hold back the said residual portion of silicic acid suspension, centrifuging the separated sodium fluosilicate crystals, washing the said crystals and drying the product.

LLEWELLYN CARDIFF OAKLEY, Jr.

REFERENCES CITED

The following references are of record in the file of this patent:

UNITED STATES PATENTS

| Number | Name | Date |
| --- | --- | --- |
| 1,938,533 | Penfield | Dec. 5, 1933 |
| 2,369,791 | Moore | Feb. 20, 1945 |

FOREIGN PATENTS

| Number | Country | Date |
| --- | --- | --- |
| 263,780 | Great Britain | Nov. 17, 1927 |